United States Patent
Krank et al.

(10) Patent No.: US 6,466,661 B2
(45) Date of Patent: *Oct. 15, 2002

(54) METHOD OF ESTABLISHING A CONNECTION, AS WELL AS EXCHANGE, SERVICE COMPUTER AND COMMUNICATIONS NETWORK

(75) Inventors: Lothar Krank, Leonberg; Wolfgang Lautenschlager, Weissach-Flacht, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,416

(22) Filed: Jun. 12, 1997

(65) Prior Publication Data
US 2001/0053219 A1 Dec. 20, 2001

(30) Foreign Application Priority Data
Jun. 12, 1996 (DE) .......................... 196 23 332

(51) Int. Cl.⁷ .............................................. H04M 3/42
(52) U.S. Cl. ............................ 379/212.01; 379/211.01; 379/211.02; 379/211.04; 379/213.01; 379/265.01; 379/265.02
(58) Field of Search ................................ 379/225, 207, 379/211, 233, 221, 199, 210, 212, 215.01, 232, 215; 179/18, 81

(56) References Cited

U.S. PATENT DOCUMENTS

| | | | | |
|---|---|---|---|---|
| 4,446,334 A | * | 5/1984 | Groff | 179/81 |
| 4,600,812 A | * | 7/1986 | Gerlits | 179/18 |
| 4,805,209 A | * | 2/1989 | Baker, Jr. et al. | 379/93.23 |
| 4,885,769 A | * | 12/1989 | Beierle | 379/214.01 |
| 5,008,930 A | * | 4/1991 | Gawrys et al. | 379/210 |
| 5,027,341 A | | 6/1991 | Jarvis et al. | |
| 5,040,208 A | * | 8/1991 | Jolissaint | 379/209 |
| 5,268,958 A | * | 12/1993 | Nakano | 379/211 |

(List continued on next page.)

FOREIGN PATENT DOCUMENTS

| | | |
|---|---|---|
| DE | 3902636 | 8/1990 |
| EP | 0633685 | 1/1995 |
| WO | 9317515 | 9/1993 |

OTHER PUBLICATIONS

"System 12 B" Kommunikationssystem SEL 563C, Standard Elektrik Lorenz AG, 01899 71412, Ausgabe 3.85, Tech. Anderungen vorbehalten.

Newton, Newton's Telecom Dictionary, 8th Edition, p. 212, Nov. 1994.*

Brown et al.,, "New Group Feature Collection for SOPHO–S ISPBXs" Philips Telecommunication Review, vol. 51 (1993) Dec., No. 3, pp. 10–16, XP000457193.

Primary Examiner—Ahmad F. Matar
Assistant Examiner—Bing Bui

(57) ABSTRACT

The invention concerns a method of establishing a connection for a communications network (KN2) in which two or more terminals (TE2 to TE7) are assigned to a user group (UG), as well as an exchange and a service computer to carry out this method. A call request is directed by a calling terminal (TE1) to a called terminal (TE5) of the communications network (KN2) which is assigned to the user group (UG). Upon a request from the other terminal or from one of the other terminals (TE2, TE3, TE4, TE6) of user group (UG), a connection (CON) is established between the calling terminal (TE1) and the requesting terminal (TE4). Before the connection between the calling terminal (TE1) and the requesting terminal (TE4) i15 has been established, data (DAT, DAT') which determine the calling terminal (TE1) are sent to the other terminal or at least to one of the other terminals (TE2, TE3, TE4, TE6) of user group (UG).

11 Claims, 4 Drawing Sheets

U.S. PATENT DOCUMENTS

| | | | |
|---|---|---|---|
| 5,309,028 A | | 5/1994 | Brown et al. |
| 5,392,342 A | * | 2/1995 | Rosenthal .................... 379/211 |
| 5,392,346 A | * | 2/1995 | Hassler et al. .............. 379/265 |
| 5,422,941 A | * | 6/1995 | Hasenauer et al. ......... 379/207 |
| 5,432,845 A | * | 7/1995 | Burd et al. ............ 379/211.01 |
| 5,490,212 A | | 2/1996 | Lautenschlager ........... 379/225 |
| 5,555,299 A | * | 9/1996 | Maloney et al. ............ 379/212 |
| 5,590,186 A | * | 12/1996 | Liao et al. .............. 379/211.02 |
| 5,619,557 A | * | 4/1997 | Van Berkum .......... 379/265.02 |
| 5,684,870 A | * | 11/1997 | Maloney et al. ............. 379/212 |
| 5,742,675 A | * | 4/1998 | Kilander et al. ............. 379/265 |
| 5,915,010 A | * | 6/1999 | McCalmont ........... 379/212.01 |
| 5,937,051 A | * | 8/1999 | Hurd et al. .................. 379/212 |
| 6,021,190 A | * | 2/2000 | Fuller et al. ................. 379/211 |

* cited by examiner

METHOD OF ESTABLISHING A CONNECTION, AS WELL AS EXCHANGE, SERVICE COMPUTER AND COMMUNICATIONS NETWORK

BACKGROUND OF THE INVENTION

1. Technical Field of the Invention

The invention concerns a method of establishing a connection for a communications network, an exchange, a service computer for a communications network, as well as a communications network.

2. Discussion of Related Art

A known method of establishing a connection in a communications network when two or more terminals are assigned to a user group comprises the steps of sending a call request from a calling terminal to a called terminal which is assigned to the user group and, in response to a request from the other terminal, or from one of the other terminals of the user group, establishing a connection between the calling terminal and the requesting terminal.

Such a generic method of establishing a connection is currently used above all in private branch exchange areas.

The invention starts with the "Call pickup" service feature which is available to the user of ISDN-capable private branch exchanges and is described for example in the overview of private branch exchanges "System 12B, Communications System SEL 5630" on page 12 of issue 3.85.

This service feature makes it possible within an authorized group to let calls arriving at one terminal to be picked up by another terminal of the group. If a call arrives at a terminal of the group the call is announced by a bell signal for example. By selecting the service feature via another terminal of the group it then becomes possible to have this terminal pick up the call. Carrying out this procedure results in the immediate pickup of the call by the pickup-terminal, i.e. a connection between the calling terminal and the pickup terminal is immediately established when this service feature is selected.

However the use of this method of establishing a connection for terminals of a user group brings with it the disadvantage that it is not possible to check whether the acceptance of the call by another terminal of the user group is useful.

SUMMARY OF THE INVENTION

The invention has the task of enabling a user-friendly connection to terminals which are assigned to a user group.

According to a first aspect of the present invention, a method of establishing a connection in a communications network wherein two or more terminals are assigned to a user group, comprising the steps of sending a call request from a calling terminal to a called terminal which is assigned to the user group, and in response to a request from a requesting terminal of the user group, establishing a connection between the calling terminal and the requesting terminal, is characterized in that prior to the step of establishing the connection between the calling terminal and the requesting terminal, data for determining the calling terminal is sent to the requesting terminal or to at least one of said two or more terminals assigned to the user group.

According to a second aspect of the invention, an exchange comprising at least one interface unit for interfacing to a plurality of terminals, means for assigning two or more terminals to a user group, means for detecting a call request from a calling terminal to a called terminal assigned to the user group, and a call control unit for initiating, in response to a request from a requesting terminal from among the two or more terminals of the user group, an establishment of a connection between the requesting terminal and the calling terminal when such a call request is detected, is characterized in that the exchange further comprises means for sending data to terminals, and that the call control unit is for causing data for determining the calling terminal to be sent to the requesting terminal or to at least one of the two or more terminals of the user group prior to the establishment of the connection between the calling terminal and the requesting terminal.

According to a third aspect of the invention, a service computer for a communications network, comprising an interface for interfacing to at least one exchange, means for assigning two or more terminals to a user group, means for detecting a call request from a calling terminal to a called terminal assigned to the user group, and a call control unit for initiating, in response to a request from a requesting terminal of the user group, establishment of a connection between the requesting terminal and the calling terminal when such a call request is detected, is characterized in that the service computer further comprises means for sending data to terminals, and that the call control unit is for causing data for determining the calling terminal to be sent to the requesting terminal or to at least one of the two or more terminals of the user group prior to the establishment of the connection between the calling terminal and the requesting terminal.

According to a fourth aspect of the invention, a communications network comprises a service provider for controlling an establishment of a connection to terminals of the communications network in accordance with the methodology of the first aspect of the present invention.

The basic idea of the invention is that data about the origin of the incoming call are sent to one or to several terminals of the user group before the call is accepted. This makes it possible to selectively accept calls in another terminal of the user group through a corresponding logic in the terminal or by displaying these data. This makes it possible for example to accept only external calls (customer calls) but not to process internal calls.

Another advantage of the invention is that this allows using determined other service features, such as "call listing". The use of these service features together with the existing "call pickup" service feature was not possible until now.

BRIEF DESCRIPTION OF THE DRAWING

In the following the invention is explained as an example by means of three configuration examples with the help of the attached drawings, wherein.

DETAILED DESCRIPTION OF PREFERRED EMBODIMENTS

The first configuration example explains how to carry out the method of establishing a connection in a communications network of the invention which contains an exchange according to the invention.

Figure 1:
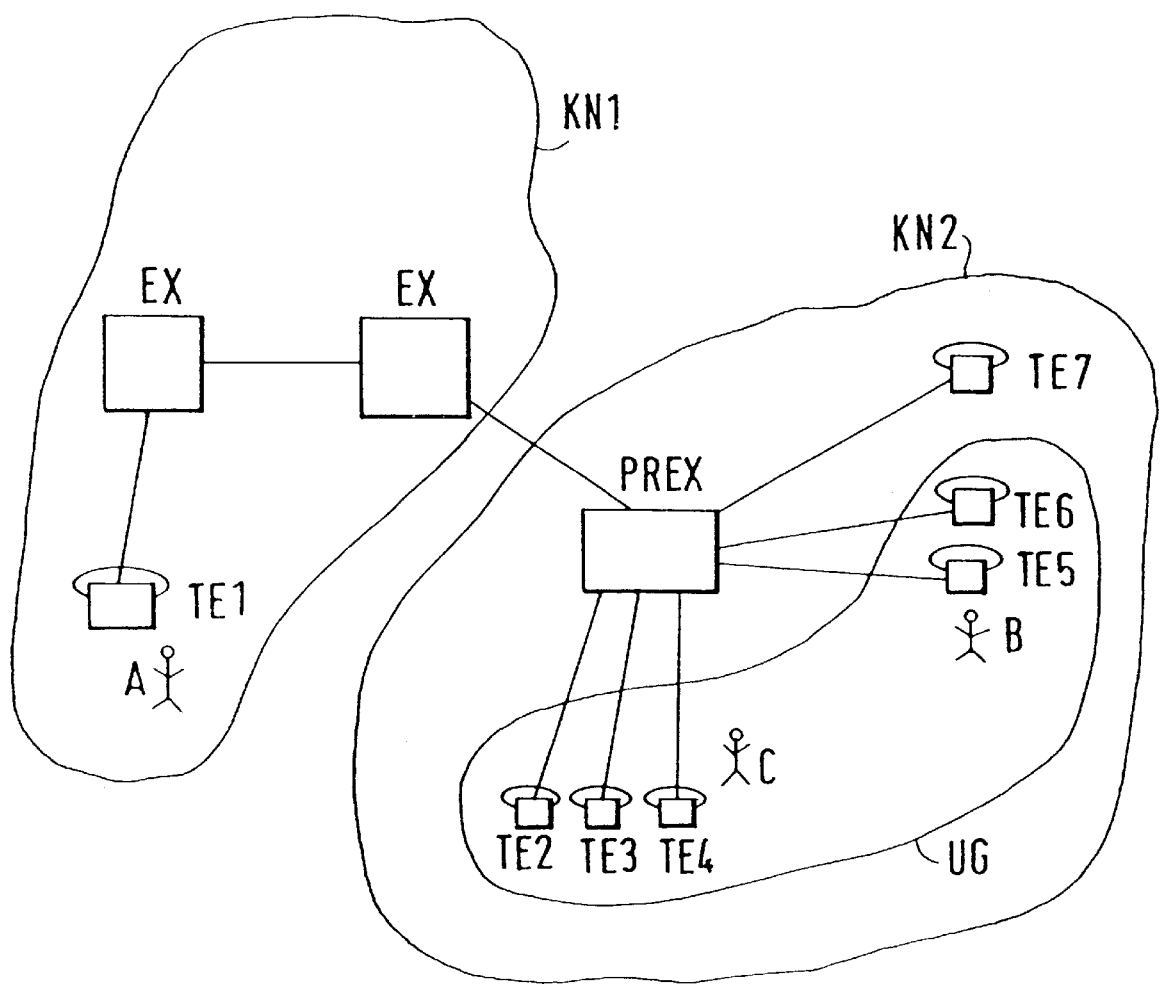
FIG. 1 is a symbolic representation of a communications environment with a communications network according to the invention.

FIG. 1 illustrates a communications environment with two communications networks KN1 and KN2. The communications network KN1 contains several exchanges EX and a terminal TE1 which is assigned to a subscriber A. The communications network KN2 contains an exchange PREX and six terminals TE2 to TE7. Terminals TE4 and TE5 are assigned to two subscribers C or B.

Terminal TE1 is connected to the exchange PREX via the exchanges EX. Terminals TE2 to TE7 are connected to the exchange PREX. The communications network KN1 is a public telephone network. Accordingly the exchanges EX are exchanges for such a public telephone network.

The communications network KN2 is a private telephone network which is connected to the public telephone network via one or several exchange lines. Accordingly the exchange PREX is a private branch exchange.

It is also possible for the communications network KN2 to have several exchanges which mesh with each other or are interconnected via the public communications network KN1. It is furthermore possible for the private communications network KN2 to be a virtual private communications network which uses services of the public communications network KN1 to link several physical communications networks to a virtual network. It is also possible for the communications network KN2 to be a public communications network. Other communications networks could be located between communications network KN1 and KN2, or the communications network KN1 can be a private communications network.

The terminals TE1 to TE7 are analog terminals with display for telephone networks. The terminals TE1 to TE7 can also be ISDN (Integrated Services Digital Network) terminals. Such terminals are for example telephones and fax machines, but also modems and interface boards for data communications.

The terminals TE2 to TE6 are assigned to a user group UG. If subscriber A now dials subscriber B via his terminal TE1, a call request is sent from the terminal TE1 to the terminal TE5 via exchanges EX and PREX. The call request is signalled to the terminal TE5 by the exchange PREX with the application of a bell signal. If one of the other terminals of user group UG now sends a request message to the exchange PREX, the latter sends data about the calling terminal TE1 to this terminal. Such data are for example the telephone number of terminal TE1, data about whether the terminal is a communications network KN2 terminal or a terminal of another communications network (external call), the identification of the communications network to which the terminal is assigned, or an identification assigned to the calling terminal TE1 by the exchange PREX.

It is also possible for the exchange PREX to determine in other ways to which of the terminals of the user group UG these data are sent. Such a possibility is that the data are sent to all the other terminals of the user group which are not making any calls at the moment. Yet a message to all the terminals, even to those who are making a call, is possible. Another such possibility is that the exchange PREX stores for each of the terminals TE2 to TE7 of user group UG a list of terminals to which the data must be sent in such a case. The elements of such a list can also be assigned priorities that enable a timely sequence of the data transmission.

After the data have been sent it then becomes possible for one of the other terminals TE2, TE3, TE4 and TE7 to pick up the call by sending a corresponding control message to the exchange PREX.

Figure 2:
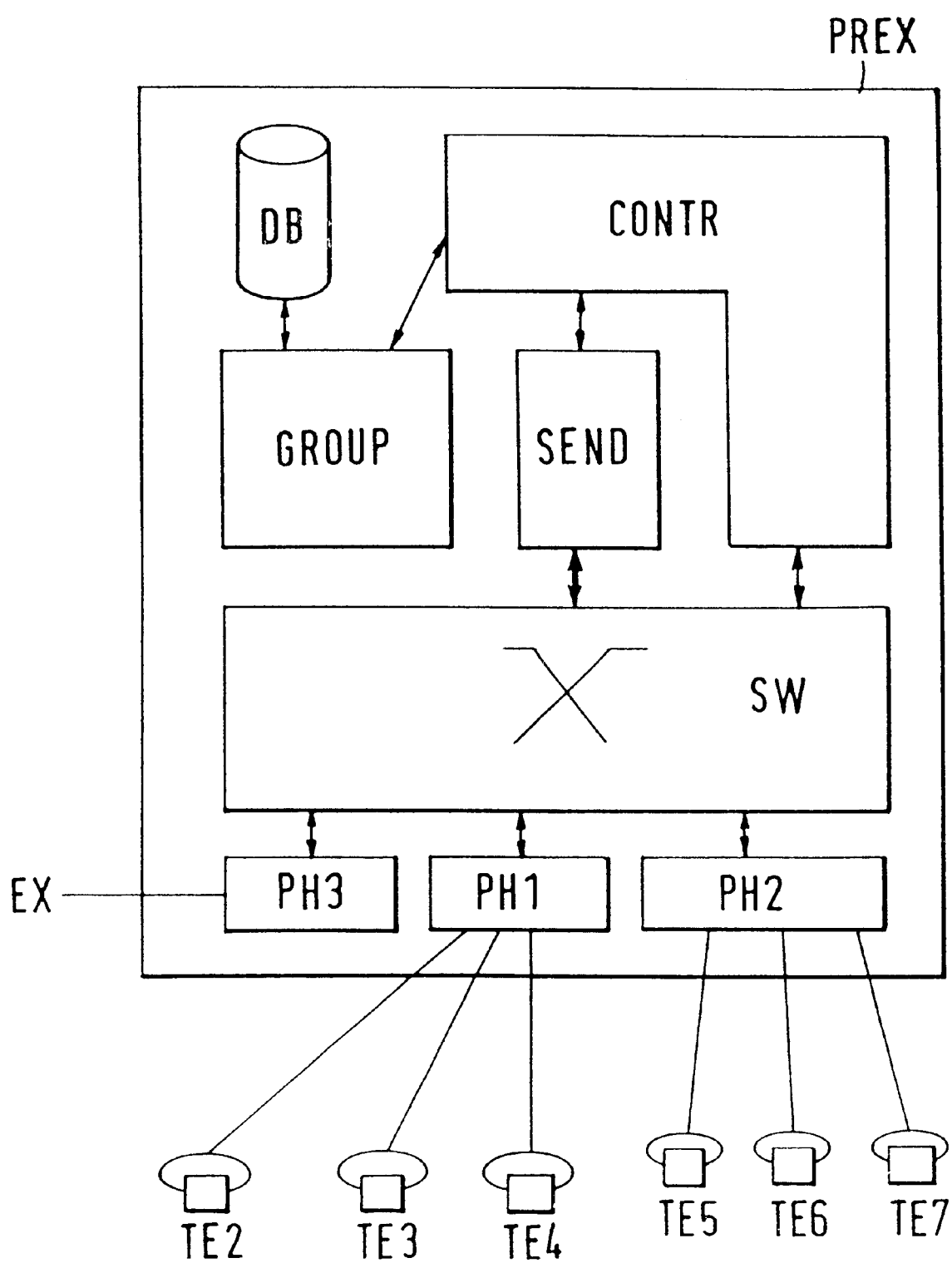
FIG. 2 is a block diagram of an exchange for the communications network in FIG. 1.

A possible construction of the exchange PREX will now be explained by means of FIG. 2. FIG. 2 illustrates the exchange PREX and the six terminals TE2 to TE7 connected thereto.

As already explained earlier, the exchange PREX is a private branch exchange. However it is also possible that it is a Centrex exchange which provides the method of establishing a connection in accordance with the invention for the terminals TE2 to TE6 as an additional service feature for the terminals of the then virtual private network KN2. (A Centrex service is a type of Bell Operating Company service that provides PBX features to the user from Central Office (CO) equipment.) It is further possible for the communications network KN2 to be part of a public communications network, for example communications network KN1. The exchange PREX would then be an exchange of this public network, which is equipped with a service unit providing this service for the terminals of the group UG.

The exchange PREX contains three connecting units PH1 to PH3, a switching network SW, two control units GROUP and CONTR, a sending unit SEND and a memory module DB. The sending unit SEND and the connecting units PH1 to PH3 exchange data via the switching network SW which is controlled by control unit CONTR. The memory module DB is managed by the control unit GROUP which in turn exchanges data with the control unit CONTR, in the manner of sending unit SEND.

The connecting units PH1 and PH2 provide the interface to the terminals TE2 to TE7 and to other exchanges EX.

The sending unit SEND enables the control unit CONTR to send data via the switching network SW and the respective one of connecting units PH1 or PH2 to one of the terminals TE2 to TE7.

The control unit CONTR controls the establishment of connections and provides the service features of the exchange PREX. The control unit CONTR is formed of a number of control programs which run on one or on several hardware and software platforms.

The memory module DB is formed of a data bank. This data bank stores the assignment of terminals TE2 to TE6 to the user group UG. It is advantageous in this case that this data bank is also used by other control programs of the exchange PREX, for example to manage the subscriber data.

The control unit GROUP manages the data set of the data bank DB concerning the assignment of terminals to user groups. A number of such user groups can be stored in the memory module DB and managed by the control unit GROUP. The control unit GROUP furthermore has algorithms enabling the rapid detection of an assignment of a terminal to a user group. In this case the control unit GROUP is formed of control programs analogous to the control unit CONTR.

If a call request is directed to the exchange PREX, this call request is routed via one of the connecting units PH1 to PH3 and the switching network SW to the control unit CONTR, which determines by means of the control unit GROUP whether this is a call request to a terminal of user group UG. If this is the case and the control unit receives a first request sequence from one of the other terminals of the user group UG via one of the connecting units PH1 to PH3 and the switching network SW, it causes data to be sent via the calling terminal by routing said data together with a corresponding control message to the sending unit SEND. If the control unit has caused such data to be sent and if a second request sequence is received by one of the other terminals of the user group UG, it sends a control message to the switching network SW causing a connection to be established from the calling terminal to this requesting terminal.

It is also possible that the control of establishing a connection and thereby the provision of this service feature does not take place by controlling an exchange, but is centrally provided by a service computer, particularly in the case of several exchanges. Such a service computer can be a Service Control Point (SCP) within the framework of the IN (Intelligent Network) concept for example. Such a service computer would contain the function groups DB, GROUP and CONTR of exchange PREX and a corresponding interface unit which provides the link and communication with the exchanges connected to this service computer. In this case the sending of data to terminals of the user group would take place indirectly in that a service exchange sends the data after receiving a control message from the service control unit. Providing this control for the method of establishing a connection has the advantage that the function of the service computer only needs to be provided once for several exchanges and that it is possible to build user groups with terminals connected to different exchanges. This is especially an advantage when a virtual private network is being used.

Figure 3:
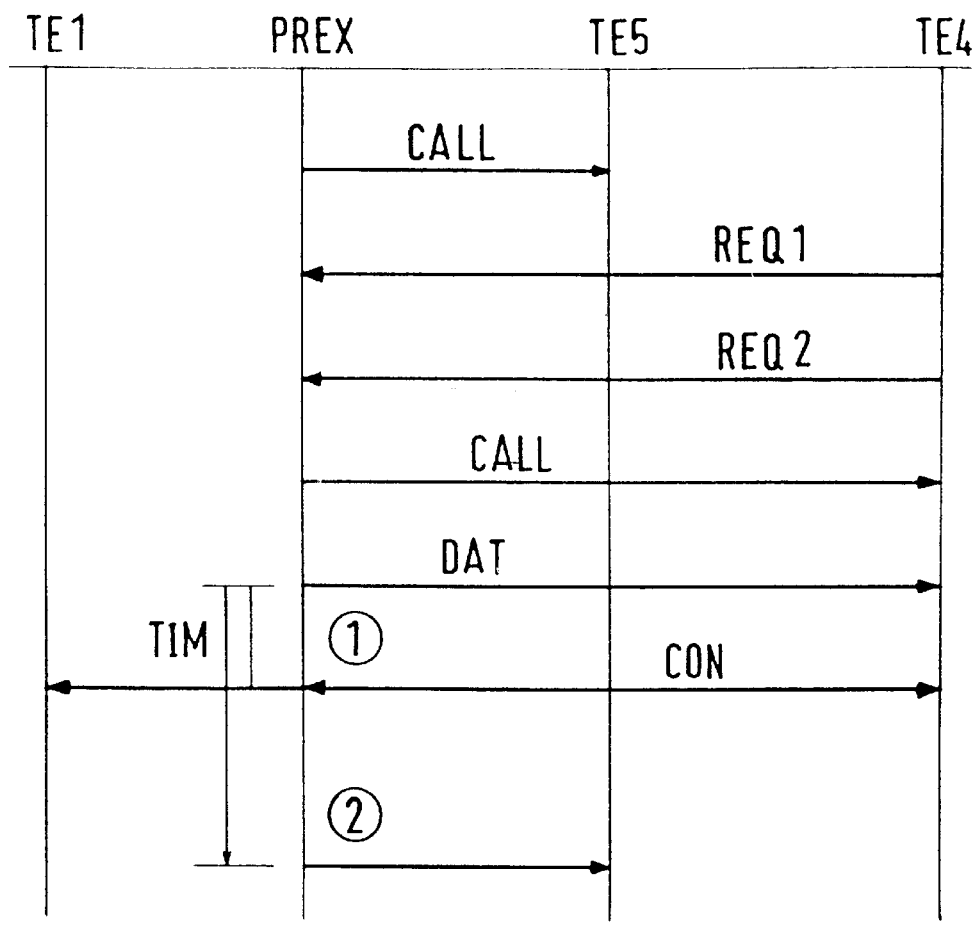
FIG. 3 is a flow diagram of a method of establishing a connection for a first configuration example.

A possible method of establishing a connection will now be described by FIG. 3 for the case where terminals TE2 to TE6 are analog terminals with display.

By means of a signalling message CALL, the exchange PREX signals to the terminal TE5 that it has received a call request from terminal TE1. Through his terminal TE4 the subscriber C now requests information about this incoming call. To that end he lifts the receiver and dials an identification signal which is signalled as request REQ1 by the terminal TE4 to the exchange PREX. He then hangs up whereby a request REQ2 is signalled to the exchange PREX. The signalling of requests REQ1 and REQ2 lets exchange PREX know that the data have been requested. The exchange PREX then signals a call to terminal TE4 and sends a message DAT in parallel to terminal TE4 which contains the data. The data are then displayed by the terminal TE4.

It is also possible for the data to be sent to the terminal TE4 in the form of a voice message. In that event the terminal TE4 does not need a display.

Sending the message DAT starts a timer in the exchange PREX. If the subscriber C decides within a time period TIM to accept the call and lifts the receiver (1), the exchange PREX causes a connection CON to be established between the terminals TE1 and TE4. If the call is not accepted within a time period TIM (2), the signalling of a call to the terminal TE4 is stopped and the call is again signalled to the terminal TE5.

Figure 4:
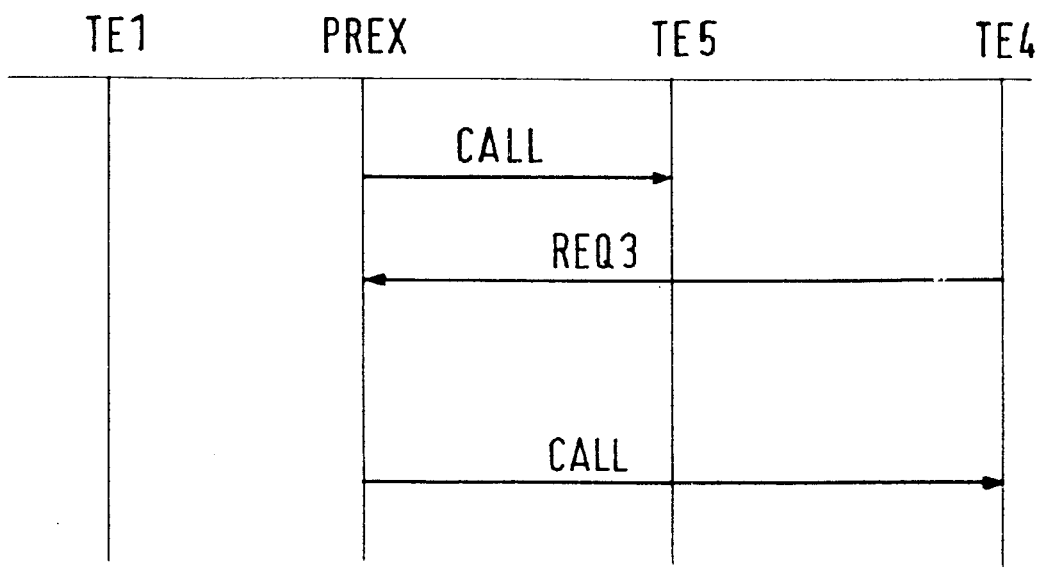
FIG. 4 is a flow diagram of a method of establishing a connection for a second configuration example.
Figure 5:
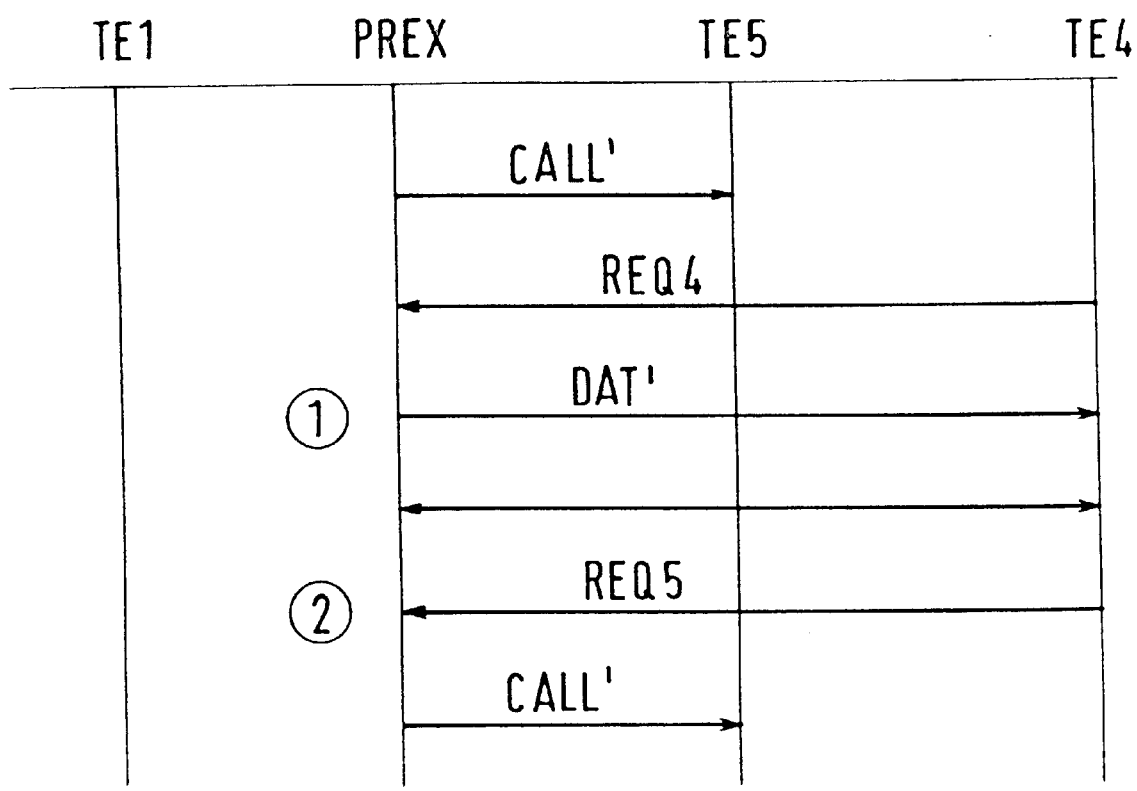
FIG. 5 is a flow diagram of a method of establishing a connection for a third configuration example.

A further possibility of establishing a connection is explained by means of FIG. 4 for the case where the terminals TE2 to TE6 are analog terminals with display.

The method of establishing a connection takes place in the second configuration example as in the first, but with the following changes: when the call CALL is signalled to the terminal TE5 by the exchange PREX, the information is requested by the terminal TE4 through a request sequence REQ3, which for example consists of lifting the receiver, sending a modem sequence and subsequently hanging up. The call CALL is then signalled to the terminal TE4. Even the return message, i.e. if the call should not be accepted, takes place in this instance by signalling (e.g. by means of a modem sequence as well).

The third configuration example explains the case where the terminals TE2 to TE6 are ISDN terminals. In this case the exchange of signalling messages between the exchange PREX and the terminals TE2 to TE6 takes place through a special signalling channel (D channel).

The exchange PREX signals a call CALL' via the signalling channel to the terminal TE5 and in this way announces a call request from the calling terminal TE1 to the terminal TE5. To receive information about the origin of the call received by terminal TE5, terminal TE4 sends a request message REQ4 via the signalling channel to the exchange PREX. The exchange PREX then sends a message DAT' with data about the calling terminal TE1 to the terminal TE4. If the subscriber C lifts the receiver, a connection between terminal TE1 and terminal TE4 is automatically established. It is also possible in this case to cause the establishment of the connection by sending a corresponding request message via the signalling channel. If subscriber C does not intend to accept the call, a message REQ5 is sent via his terminal to the exchange PREX, whereupon the latter again causes the call CALL' to be signalled to terminal TE5.

It is also possible for the arrival of a call CALL' to be signalled to the terminal TE4 simultaneously with the sending of the message DAT'.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of establishing a connection in a communications network between a calling terminal and a terminal in a user group having two or more terminals, comprising the steps of:

sending a call request from the calling terminal to a first terminal in the user group;

announcing the call request;

in response to a request message from a second terminal in the user group asking for information about the call request, sending data for determining the calling terminal to the second terminal; and in response to an indication of acceptance by the second terminal, establishing a connection between the calling terminal and the second terminal.

2. A method a claimed in claim 1, characterized in that the data for determining the calling terminal is sent to all idle terminals of the user group.

3. A method as claimed in claim 1, characterized in that the data for determining the calling terminal is sent to the second terminal or to said one of the other terminals on request.

4. A method as claimed in claim 1, characterized in that the data for determining the calling terminal is displayed by the second terminal of the user group to which the data was sent.

5. A method as claimed in claim 4, characterized in that the data is displayed at the second terminal for a given period of time.

6. A method as claimed in claim 1, characterized in that as the data for determining the calling terminal, a directory number of the calling terminal is used.

7. A communications network (KN2) with a service provider (PREX) for controlling an establishment of a connection to terminals of the communications network in accordance with the method of establishing a connection in claim 1.

8. An exchange comprising:
at least one interface unit for interfacing to a plurality of terminals;
means for assigning two or more terminals to a user group;
means for detecting a call request from a calling terminal to a first terminal assigned to the user group;
means for sending data to terminals; and
a call control unit for causing data for determining the calling terminal to be sent to a second terminal or to at least one of the two or more terminals of the user group, in response to a request message asking for information about the call request from the second terminal and prior to the establishment of the connection between the calling terminal and the second terminal,
the call control unit also for initiating an establishment of a connection between the second terminal and the calling terminal in response to an indication of acceptance by the second terminal.

9. An exchange as claimed in claim 8, characterized in that the exchange (PREX) is a private branch exchange.

10. An exchange as claimed in claim 8, characterized in that the exchange is a Centrex exchange.

11. A service computer for a communications network, comprising:
an interface for interfacing to at least one exchange;
means for assigning two or more terminals to a user group;
means for detecting a call request from a calling terminal to a first terminal assigned to the user group;
means for sending data to terminals; and
a call control unit for causing data for determining the calling terminal to be sent to a second terminal or to at least one of the two or more terminals of the user group, in response to a request message asking for information about the call request from the second terminal and prior to the establishment of the connection between the calling terminal and the second terminal and prior to the establishment of the connection between the calling terminal and the requesting terminal,
the call control unit also for initiating establishment of a connection between the second terminal and the calling terminal in response to an indication of acceptance by the second terminal.

* * * * *

UNITED STATES PATENT AND TRADEMARK OFFICE
CERTIFICATE OF CORRECTION

PATENT NO.     : 6,466,661 B2
DATED          : October 15, 2002
INVENTOR(S)    : Lothar Krank et al.

It is certified that error appears in the above-identified patent and that said Letters Patent is hereby corrected as shown below:

<u>Title page,</u>
Item [57], ABSTRACT,
Line 15, "i15" should be deleted.

Signed and Sealed this

Fourth Day of March, 2003

JAMES E. ROGAN
*Director of the United States Patent and Trademark Office*